July 24, 1928.
T. A. EDISON
1,678,246
PRODUCTION OF ALKALI METAL COMPOUNDS FROM SILICATES CONTAINING THEM
Filed June 28, 1922
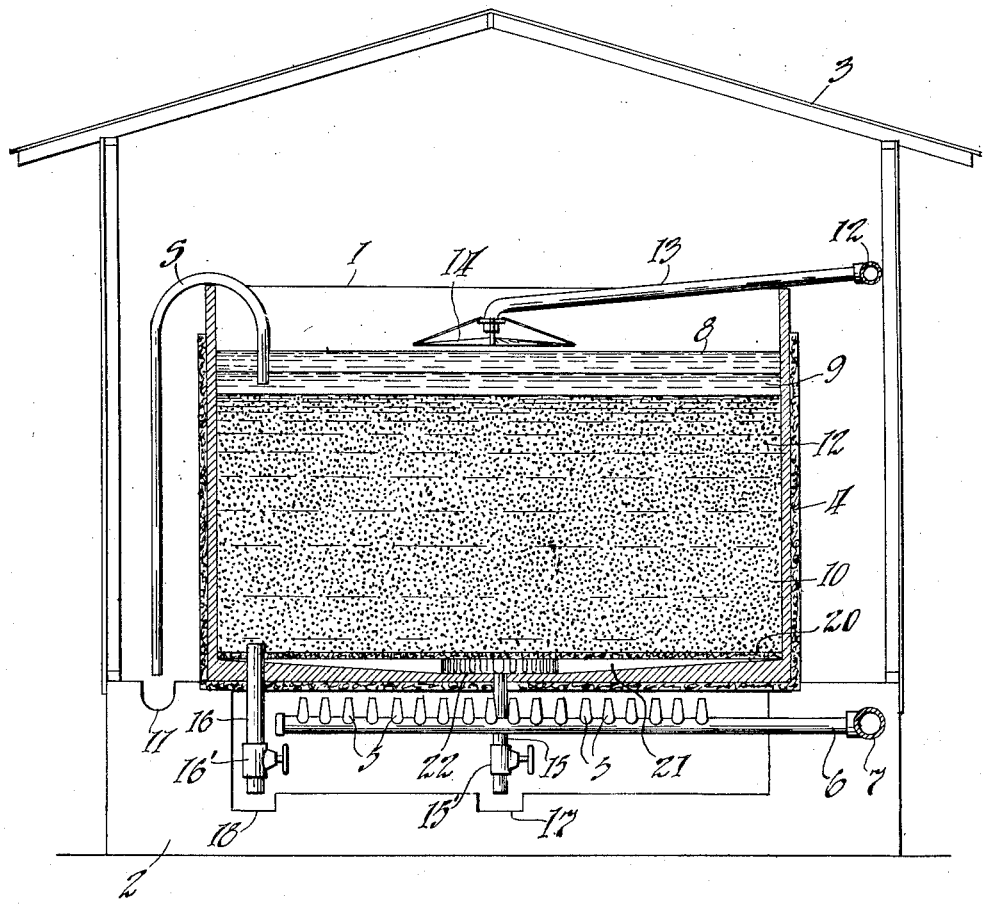
Witnesses:
H. Q. Fisher
William A. Hardy
Inventor:
Thomas A. Edison
by Henry Lanahan
his Atty.

Patented July 24, 1928.

1,678,246

UNITED STATES PATENT OFFICE.

THOMAS A. EDISON, OF LLEWELLYN PARK, NEW JERSEY, ASSIGNOR TO THOMAS A. EDISON, INCORPORATED, OF WEST ORANGE, NEW JERSEY, A CORPORATION OF NEW JERSEY.

PRODUCTION OF ALKALI-METAL COMPOUNDS FROM SILICATES CONTAINING THEM.

Application filed June 28, 1922. Serial No. 571,394.

My invention relates to the extraction of alkali metal compounds from silicates and particularly to the production of soluble potassium salts from potassium bearing rocks or minerals, such as feldspar and potash slates, and soluble lithium salts from lithium bearing rocks or minerals such as spodumene and lepidolite.

The principal object of my invention resides in a simple and improved method for obtaining alkali metal compounds such as soluble potassium and lithium salts from silicates containing potassium and lithium, in a cheaper and more effective manner than is possible by various methods heretofore suggested, whereby the soluble potassium or lithium salt or other alkali metal compound may be practically produced or obtained from such silicates on a commercial basis.

Another object of my invention is to produce the alkali metal compounds, especially soluble salts of potassium and lithium, by suitable treatment of feldspar, spodumene or other silicious rock or material at ordinary atmospheric pressure and without heating at high temperatures.

A further object of my invention is to provide an improved form of tank especially adapted to be used for the treatment of silicates in accordance with the method disclosed herein.

Other objects and features of my invention will be hereinafter more fully described and claimed.

My method is based on the digestion of feldspar, spodumene or other silicate, with lime. In the methods heretofore suggested for the treatment of feldspar or other silicate with lime for the purpose of producing the soluble potassium salt or other alkali metal compound, the mixtures of silicate and lime are usually subjected to a high heat under pressure. I have discovered, however, that by grinding or otherwise reducing the silicate rock or mineral to a very high degree of fineness and then bringing the same into intimate mixture with the proper amount of slaked lime, the soluble potassium or lithium salt, or other alkali metal compound, may be obtained by subjecting the mixture to a very low degree of heat under ordinary atmospheric pressure. The rapidity and completeness of the production increase enormously with the degree of fineness of the silicate.

In the treatment of silicious material in accordance with my invention I preferably grind or reduce such material to a fineness nearly equal to that of clay, or substantially that of precipitated chalk, so that it is practically in the form of an impalpable powder, mix this very finely divided material with caustic lime, preferably in the form of milk of slaked lime, then subject this mixture to a low heat at atmospheric pressure for quite a long period of time, sufficient to free nearly all of the alkali metal and convert the same into a hydrate, treat the resultant clay-like mixture or pulp in a novel manner so as to separate therefrom practically all the soluble salts and water, and finally evaporate or drive off the water from such salts. These salts are the alkali metal compounds sought, being in the form of the hydrates of such alkali metals.

I find that the rapidity of production of the soluble potassium or lithium salt or other alkali metal compound may be materially increased by preliminarily burning or igniting the feldspar, spodumene or other silicate rock prior to the reduction thereof to the extremely finely divided state and the mixing thereof with the lime. When the silicate rock is subjected to this preliminary burning or ignition, I first preferably grind the same to a fineness of about 200 mesh, then maintain the same for about a half hour at a bright red heat but less than that necessary for fritting, allow the ignited rock to cool and then reduce it to the extremely finely divided or powdered condition for admixture with lime and the subsequent treatment above described. While under some circumstances it is advantageous to subject the silicate rock to this preliminary burning or ignition, under some conditions I prefer to omit this step due to the expense involved.

The single figure in the drawing accompanying and forming a part of this specification is a somewhat diagrammatic view of one form of apparatus including my improved tank, which may be employed to carry my invention into effect.

Reference character 1 represents an iron or concrete tank mounted on the foundation 2 of a building 3 in which the tank is housed. The tank 1 in which the finely divided silicate is treated with lime in accordance with my invention, is large, preferably being capable of holding about one thousand tons of the mixture and is preferably cylindrical in form; and the building 3 may, of course, be of a size sufficient to house any desired number of these tanks.

In carrying out my invention, a quantity of the feldspar, spodumene, or other silicate to be treated, ground or reduced to a fineness substantially that of precipitated chalk, is first mixed with caustic lime preferably in the form of milk of slaked lime, the amount of milk of slaked lime employed preferably being such that the caustic lime will be substantially equal in weight to the finely divided silicate and the amount of water present in the milk of lime being sufficient to produce a mixture of such fluidity that all the silicate will be brought into intimate contact with caustic lime. The mixture of silicate and milk of slaked lime is then placed in the tank 1, and the contents of the tank subjected to a continuous heat, at a temperature below the boiling point of the mixture and preferably at a temperature of 170° to 180° Fahrenheit, although this temperature is subject to considerable variance, until most of the potassium or lithium has been freed from the silicate and converted into a hydrate, preferably, for a period of from 40 to 60 days. This treatment usually results in freeing from the silicate and converting into a hydrate about 85% of the potassium or lithium (where the mineral treated is a potassium or lithium bearing silicate) depending upon the degree of fineness to which the silicate has been reduced. In performing this step of my process, the proportions of caustic lime and finely divided silicate may be greatly varied. For example, anywhere from 5 to 15 or more parts by weight of caustic lime may be used with 10 parts by weight of silicate. Where the weight of caustic lime is substantially less than that of the finely divided silicate, however, the reaction between the lime and the silicate is much slower and the percentage of the potassium or other alkali metal which it is possible to free or extract from the silicate is appreciably reduced. With such smaller amount of caustic lime a certain percentage of the potassium or other alkali metal is freed from the silicate after the mixture is heated for a certain length of time, and then the reaction practically stops so that there is no appreciable increase in the amount of the alkali metal compound produced upon continued heating of the mixture. If more caustic lime than silicate is used, the increase in the percentage of potassium or other alkali metal compound produced from the silicate over that obtained by the use of an equal amount of caustic lime will be comparatively small. For the reasons stated, I therefore prefer to employ substantially equal amounts by weight of caustic lime and finely divided silicate.

The side walls and bottom of the tank 1, when the latter is of iron, are covered with a non-heat conducting material such as asbestos, as indicated at 4, to prevent the loss of heat from the mixture treated in the tank. This, however, is unnecessary in case a concrete tank is used. The contents of the tank may be maintained heated at the desired temperature and for the desired period by any suitable means such as a steam coil (not shown) disposed in the tank, or by hot air which may either be conducted beneath the tank through suitable passage ways or conduits formed in the foundation 2, or may issue from a bank of nozzles 5 connected by means of pipes 6 and 7 with a suitable furnace (not shown).

Before heating the mixture of silicate and milk of lime in the tank 1, as described above, the same is covered with a layer 8 of oil of high boiling point such, for example, as straw oil of the kerosene distillates or paraffin oil, preferably the latter. This layer of oil prevents the carbonation of the lime and the alkali metal compound produced from the silicate by the reaction which results from the heating of the mixture.

When the reaction between the caustic lime and silicate is completed, that is, at the end of the period during which the mixture is continuously subjected to heat, the oil 8 and the excess water which accumulates just beneath the oil, indicated at 9, are drawn from the tank 1 as by means of a siphon S discharging into a suitable trough 11. The material remaining in the tank is now in the form of a mass of pulp 10, this pulp consisting of a clay-like mixture of calcium silicates and other similar insoluble compounds, water and soluble salts comprising hydrates of potassium, lithium, or other alkali metal, according to the silicate rock treated, and also more or less caustic lime. A large amount of fresh water is now introduced into the tank from above so as to obtain a considerable head of water on top of the pulp. This water should be introduced very carefully so as not to disturb or become mixed with the pulp. To obtain this result I may supply this water to the tank 1 from a main pipe 12 through a branch pipe 13 having suitably secured thereto and spaced slightly beneath its discharge end a baffle 14 to break the force of the water discharged from said branch pipe. If this fresh water is properly added to the tank practically none of the same will become mixed with the liquid in the pulp and there will be a sharp line of demarcation between said water and said liquid. The bottom of the tank 1 is provided centrally thereof with a small discharge aperture communicating with a small pipe 15 provided with a valve 15', and adjacent its edge with a large opening through which extends a large pipe 16 provided with a valve 16', the valves 15' and 16' controlling the discharge from the tank into troughs 17 and 18, respectively. When the desired amount of fresh water has been introduced into the tank through the pipe 13, the valve 15' is opened. The head of fresh water on top of the pulp mixture now acts as a piston to displace the water and soluble salts from such mixture and force the same from the tank 1 through the small central aperture in the bottom of the tank and the small pipe 15. In order to prevent any of the very fine silt-like solid material of the pulp mixture being forced from the tank through the pipe 15, a screen 20 of heavy porous fibrous material is disposed just above the bottom of the tank so as to cover all of the latter except the opening through which the large pipe 16 projects. The upper side of the bottom of the tank is provided with numerous channels 21 radiating in all directions from a recess 22 with which the small central aperture and the small pipe 15 communicate. The screen 20 permits the ready passage therethrough of the liquid containing salts in solution, which is displaced from the pulp mixture by the head of fresh water, but does not permit the pulp itself to pass therethrough, while the channels 21 act to conduct this displaced liquid to the recess 22 and the small discharge pipe 15 and accordingly prevent any retarding of the displacing action of the head of fresh water which might otherwise result from such liquid accumulating on the bottom of the tank, especially at points remote from said recess. The screen 20 and the channeled bottom of the tank here function in a manner similar to a unit or cell of a filter press. The displacing of the water and soluble salts from the pulp mixture as described, results from the percolation of the fresh water through the mass of solid material in such mixture, which material while it is exceedingly finely divided, is not in a colloidal state. Such displacement is effected without any material mixing of the fresh water with the water and soluble salts of the pulp mixture. For example, where the pulp mixture has a depth of several feet, the fresh water introduced into the tank on top of this mixture, as described, will percolate slowly through the whole of the non-colloidal mass of extremely finely divided insoluble solids of such mixture so as to displace therefrom practically all of the liquid therein consisting of water and the soluble salts consisting of potassium or other alkali metal compounds, and force such liquid from the tank through the small pipe 15, while at the same time the fresh water will become mixed with the liquid of the pulp mixture to a depth of only a few inches. The head of fresh water is maintained on the pulp mixture until the liquid forced from the small pipe 15 contains practically no soluble salts of potassium, lithium or other alkali metal, which requires many days, usually about two weeks. The valve 15' is now closed and the liquid which has been discharged therefrom into the trough 17 is suitably treated, preferably by what is known as the triple-effect evaporation process, to obtain the hydrates of potassium, lithium, or other alkali metal in a dry or solid state.

The valve 16' of the tank 1 is then opened and the solid material remaining in the tank is removed as by blowing or washing the same through the large pipe 16 by means of a stream of water. The material thus removed contains practically no potassium, lithium, or other alkali metal compounds, and in so far as the purposes of the present invention are concerned, is waste.

The tank 1 is now ready for another batch of the mixture of silicate and milk of lime to be treated as described above.

Having now described my invention, what I claim as new and desire to protect by Letters Patent, is as follows:

1. The herein described method which consists in mixing milk of lime with finely divided silicate containing an alkali metal, subjecting the mixture to sufficient heat to free substantially all of the alkali metal from the silicate, and then subjecting the resultant mass to a head of liquid sufficient to remove therefrom by displacement the water and soluble salts therein, substantially as described.

2. The herein described method which consists in mixing finely divided silicate containing an alkali metal with milk of lime, subjecting the mixture to sufficient heat to free the alkali metal from the silicate, removing the excess water which accumulates on top of the mixture, and then subjecting the resultant mass to a head of liquid sufficient to remove therefrom by displacement the water and soluble salts therein, substantially as described.

3. The herein described method which consists in mixing caustic lime and water with finely divided silicate containing an alkali metal, covering the mixture with a layer of oil, subjecting the mixture to sufficient heat to free the alkali metal from the silicate, then siphoning the oil and excess water off the top of the resultant mass, and then subjecting said mass to a head of liquid sufficient to remove therefrom by displacement the water and soluble salts therein, substantially as described.

4. The herein described method which consists in mixing milk of lime with finely divided potassium or lithium bearing mineral, covering the mixture with a layer of oil having a high boiling point, then heating the mixture at a temperature of substantially 170° to 180° Fahrenheit for a period of from 40 to 60 days, removing the oil and excess water from off the top of the resultant mass and then subjecting said mass to a head of liquid sufficient to remove therefrom by displacement the water and soluble salts therein, substantially as described.

5. The herein described method which consists in mixing finely divided silicate containing an alkali metal with an alkaline earth hydrate and water, subjecting the mixture to sufficient heat to free the alkali metal from the silicate, and subjecting the resultant mass to a head of liquid sufficient to remove therefrom by displacement the water and soluble salts therein, substantially as described.

This specification signed this 23d day of June, 1922.

THOS. A. EDISON.